Nov. 15, 1949     A. E. KERN     2,488,202
ANIMAL TRAP
Filed Nov. 25, 1947     3 Sheets-Sheet 1

INVENTOR
ARTHUR E. KERN
BY *Everett F. Wright*
ATTORNEY

Nov. 15, 1949  A. E. KERN  2,488,202
ANIMAL TRAP
Filed Nov. 25, 1947  3 Sheets-Sheet 2

INVENTOR
ARTHUR E. KERN
BY *Everett F. Wright*
ATTORNEY

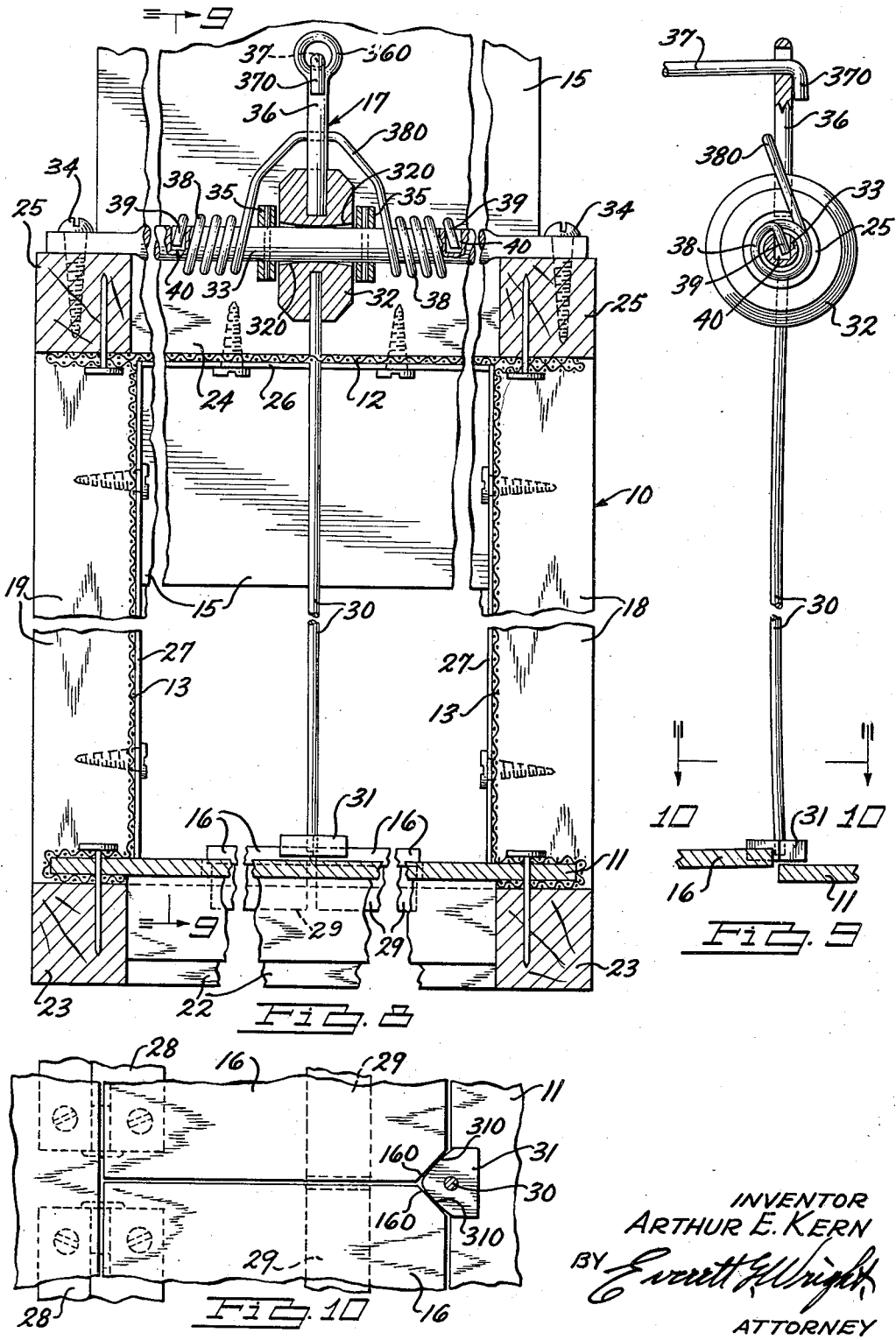

Patented Nov. 15, 1949

2,488,202

UNITED STATES PATENT OFFICE 2,488,202

ANIMAL TRAP

Arthur E. Kern, Detroit, Mich.

Application November 25, 1947, Serial No. 787,888

5 Claims. (Cl. 43—61)

This invention relates to improvements in animal traps and in particular to traps adapted to catch rodents, field animals, birds and the like without killing them.

In the prior art there have been many and sundry types of animal traps, however, none has proven completely satisfactory because of the fact that they have not been sufficiently sensitive and because the mechanism thereof arouses the suspicion of the animals to be trapped.

With the foregoing in view, the primary object of the invention is to provide an improved animal trap particularly sensitive in operation which catches rodents and other animals alive with assurance of a substantially one hundred percent entrapment of animals enticed thereinto by the bait set therein.

A further object of the invention is to provide an animal trap which is economical to manufacture, is readily set, and which is not only positive in its functioning but is easy to unload into a bucket or the like where the animal caught may be drowned.

A still further object of the invention is to provide an animal trap which will not only readily catch large animals such as foxes, cats, dogs, skunks and rodents such as rats, squirrels, beavers, porcupine and rabbits, but will also catch small animals such as mice, the said animal trap having an extremely sensitive trigger mechanism that is positive in action and will not readily get out of order.

Other objects of the invention will become apparent by reference to the following detailed description taken in connection with the accompanying drawings, in which:

Fig. 8 is an enlarged cross sectional view taken on the line 8—8 of Fig. 2 showing the trigger mechanism in detail.

Fig. 9 is a detailed sectional view taken on the line 9—9 of Fig. 8.

Fig. 10 is an enlarged fragmentary horizontal sectional view taken on the line 10—10 of Fig. 9.

Figure 1:
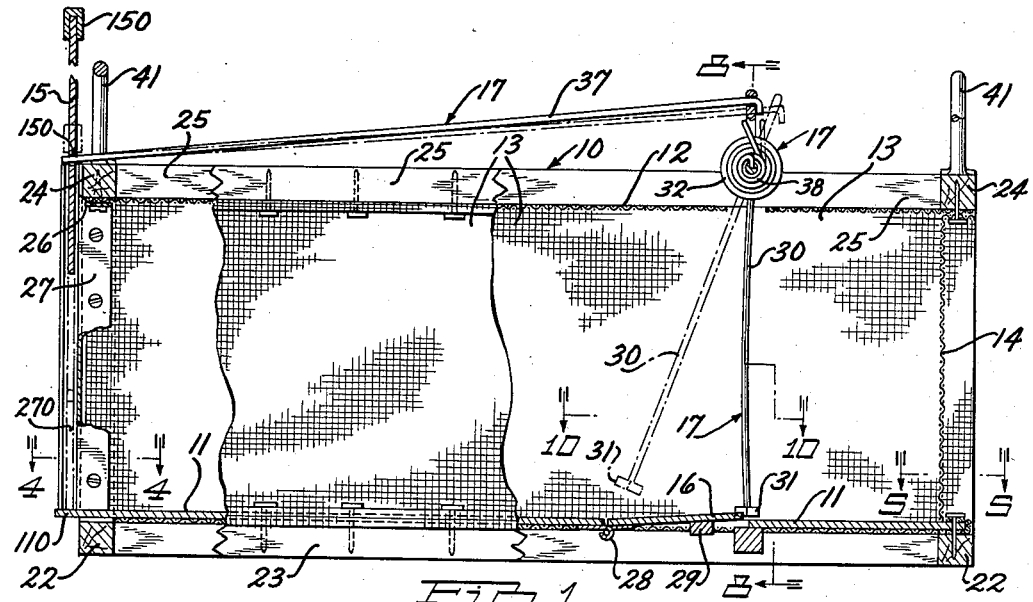
Fig. 1 is a side elevational view of an animal trap embodying the invention, portions thereof being broken away and shown in section to illustrate the construction more clearly.

Referring now to the drawings wherein like numerals refer to like and corresponding parts throughout the several views, the particular embodiment of the invention shown for the purpose of illustrating the invention comprises a rectangular frame 10 shown to be of wood construction but which may be formed of metal if desired, a floor 11 preferably of plywood, a roof 12, sides 13 and a rear end 14 of a relatively large mesh reticulated material such as woven wire screening, a gravity closing metal sliding trap door 15, hinged floor sections 16, and a trigger mechanism hereinafter described in detail generally designated by the numeral 17 adapted to hold the said sliding door open and release the same responsive to the weight of an animal on either or both of the said hinged floor sections 16.

Figure 6:
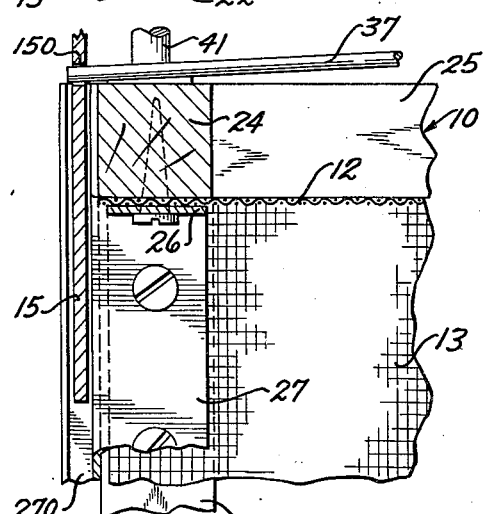
Fig. 6 is an enlarged fragmentary vertical sectional view taken on the line 6—6 of Fig. 2.
Figure 7:
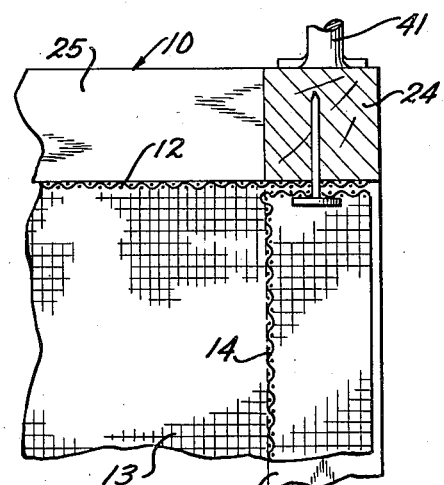
Fig. 7 is an enlarged fragmentary vertical sectional view taken on the line 7—7 of Fig. 2.

The frame 10 may be joined at the corners in any suitable manner as by such means as mortise and tenon joints or ship lap or both. The plywood floor is notched out at the corners around the corner posts 18, 19, 20 and 21, is supported on the top of transverse and longitudinal lower frame members 22 and 23 respectively, and extends outwardly in front at 110 to provide a support for the gravity closing front sliding door 15 when closed. The roof 12, suspended below transverse and longitudinal upper frame members 24 and 25 respectively, the sides 13 and the rear end 14, all formed of metal reticulated material, are preferably lapped at the joints therebetween and tacked in place on the frame 10 as required. The bottom of the sides 13 and the bottom of the rear end 14 are preferably lapped around the edge of the floor 11 as indicated in Figs. 7 and 8. A metal finishing strip 26 is preferably provided at the door head as shown in Fig. 6 to anchor the front end of the reticulated roof 12 to the transverse upper frame member 24 above the door opening.

Figure 5:
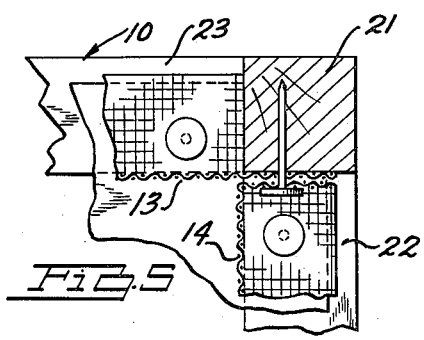
Fig. 5 is an enlarged fragmentary horizontal sectional view of a rear corner taken on the line 5—5 of Fig. 1.

The jambs of the door opening are preferably finished by metal jamb strip 27 which is formed around each upright corner post 18 and 19 as best indicated in Fig. 5 to provide opposite guides 270 into which the gravity closing metal trap door 15 slides. The top of the said metal sliding door 15 is preferably provided with a weight strip 150 across the top thereof to stiffen the said door and to serve as a weight therefor to assure the rapid gravity dropping thereof when released for closing by the trigger mechanism 17. Obviously other details and types of frame construction, flooring, sides, roof and ends may be employed, it being essential that, if a wooden frame is used, no wood is exposed to the inside of the trap except the floor which should be of a composition type plywood or metal which cannot be gnawed by an animal caught in the trap.

Figure 2:
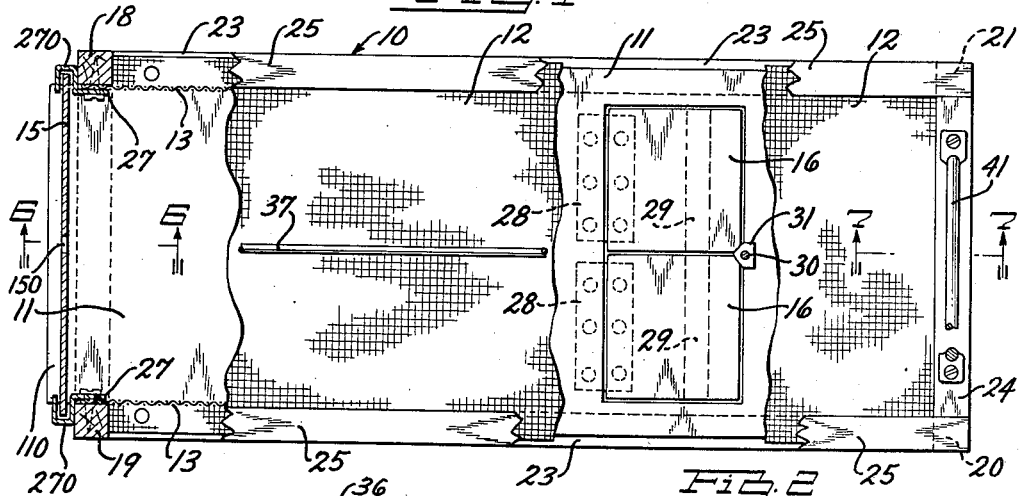
Fig. 2 is a top plan view with portions thereof broken away.

The floor 11 is provided with a pair of laterally adjacent hinged sections 16 located two-thirds to three-quarters the length of the trap from the trap door end thereof. These sections 16 are each approximately one-half the width of the trap and are hinged by suitable hinges 28 fixed to the underside thereof and to the underside of the floor 11 as best shown in Figs. 1, 2, and 10. A metal weight 29 is secured to the bottom of each of the hinged floor sections 16 to assure their rapid dropping to a horizontal position from their elevated position indicated in Figs. 1, 2, 8, 9 and 10.

The trigger mechanism 17 is composed of a resilient yet relatively stiff trigger rod 30 having an abutment 31 on the lower end thereof and fixed at its upper end in radial extending relationship from an annular trigger bearing 32 rotatably mounted on a transversely disposed trigger support 33 comprising a rod which is preferably flattened at both ends and secured at each end to the top of an upper longitudinal frame member 25 by a suitable screw 34. The inner bore of the said annular bearing 32 is suitably tapered from both ends thereof as indicated by the numeral 320 in Fig. 8 to permit the trigger bearing 32 and trigger rod 30 depending therefrom to rock longitudinally of the said trigger support 33 between the limits provided by a pair of annular shoulders 35 preferably pinned onto the said trigger support 33 in spaced relationship to the said trigger bearing 32 as shown in Fig. 9. A preferably round trigger latch arm 36 having a loop 360 formed at the top thereof is fixed in the trigger bearing 32 extending therefrom diametrically opposite to the trigger rod 30. A trigger latch rod 37 having a hooked end 370 is disposed through the loop 360 of the trigger latch arm 36 and extends forwardly to the sliding trap door 15 and through an aperture 150 therethrough as indicated in Figs. 1 and 6 when the said sliding trap door is up and the trigger is in its cocked position as shown in the full lines in Fig. 1 and in Figs. 2, 8, 9, and 10. A trigger spring 38 coiled around the trigger support 33 with its ends 39 anchored in radial bores 40 in the said trigger support 33 is formed with a transverse or arched loop 380 which bears against the preferably round trigger latch arm 36 extending upwardly from the trigger bearing 32 and constantly urges the said trigger rod 30 to move forwardly to the position indicated by the dot and dash lines in Fig. 1 which is the position assumed by the said trigger rod 30 after the trap door 15 closes, responsive to the springing of the trigger mechanism 17.

The rearmost adjacent corners 160 of the laterally adjacent hinged floor sections 16 are preferably chamfered on opposite angles as indicated in Figs. 2 and 10. The preferably curved generally complementary angular faces 310 of the abutment 31 on the trigger rod 30 bear against said chamfered corners when the trap is set by cocking the trigger mechanism 17 and releasing it. The said abutment 31 on the trigger rod 30 thus bears against both of the hinged floor sections 16 as above described. The gravity sliding trap door 15 is then raised and the trigger latch rod 37 is slid forward into the aperture 150 in the said trap door 15. When the trap is in the set position, the said sliding door 15 is supported on the end of the trigger latch rod 37 which in turn is supported on the front upper transverse frame member 24 of the frame 10 as best shown in Figs. 1 and 6.

Figure 3:
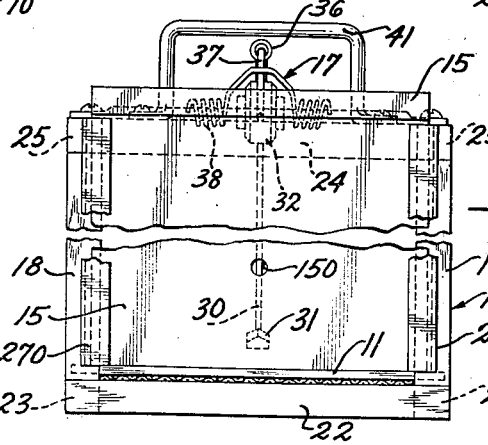
Fig. 3 is a front elevational view.
Figure 4:
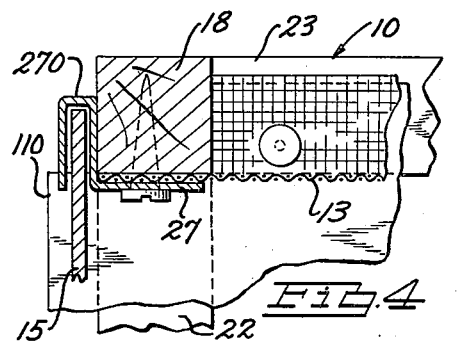
Fig. 4 is an enlarged fragmentary horizontal sectional view of a front corner taken on the line 4—4 of Fig. 1.

In its set position with the trigger cocked, the relatively stiff trigger rod 30 may become slightly bowed as indicated in Fig. 1. When the weight of an animal depresses either of the hinged floor sections 16, the trigger mechanism 17 operates by a lateral as well as a forward movement of the trigger rod 30, the other floor section 16 instantly drops level with the one depressed by the animal, and the gravity sliding trap door 15 closes. The flexing and rocking of the trigger rod 30 laterally with respect to the central joint between the hinged floor sections 16 and the rocking of the trigger bearing longitudinally with respect to the trigger support 33 during the springing of the trigger mechanism 17 makes the trap ultra sensitive and positive in operation. This is true when only one hinged floor section is employed inasmuch as when the trap is sprung the trigger rod passes rapidly around the animal being trapped and is not retarded in action by the presence of the animal in the trap. While the shape of the abutment 31 is important, obviously, other shapes can be employed in combination with the remaining mechanism to accomplish like results. As indicated in Figs. 1, 2 and 3, suitable handles 41 are provided for ease in carrying and emptying the trap.

Although but a single embodiment of the invention has been disclosed and described, many changes may be made in size, shape, arrangement and detail of the several elements of the invention without departing from the spirit and scope thereof as defined by the appended claims.

I claim:

1. In an animal trap of the type including a gravity sliding door and a hinged floor section employing a spring loaded trigger mechanism adapted to hold the said gravity sliding door open when the trap is set and releasable responsive to an animal walking onto the said hinged floor section, the said trigger mechanism comprising a trigger support on top of the trap, a trigger bearing having a convex bearing surface journaled on the said trigger support, a trigger rod fixed to and depending from the said trigger bearing through the trap and engaging the raised end of the said hinged floor section when the trap is set, a trigger latch arm fixed to and extending upwardly from the said trigger bearing, a trigger latch rod connected at one end to the said trigger latch arm adapted to support the said gravity sliding door at its other end when the trap is set, and a spring on the said trigger support adapted to urge the said trigger bearing to rotate thereon whereby to release the said trigger latch rod from the said gravity sliding door when the said trap is sprung by an animal walking on and lowering the hinged floor section, the said trigger rod being free to pass around either side of an animal in the trap upon the springing thereof.

2. In an animal trap of the type including a gravity sliding door comprising a pair of laterally adjacent hinged floor sections, and a spring loaded trigger mechanism adapted to hold the said gravity sliding door open when the trap is set and releasable responsive to an animal walking onto either of the said hinged floor sections, the said trigger mechanism being composed of a trigger support on top of the trap, a trigger bearing having a convex bearing surface journaled on the said trigger support, a trigger rod fixed to and depending from the said trigger bearing through the trap and adapted to engage the raised adjacent ends of the said hinged floor sections when the trap is set, a trigger latch arm fixed to and extending upwardly from the said trigger bearing, a trigger latch rod connected at one end to the said trigger latch arm and adapted to support the said gravity sliding door at its other end when the trap is set, and a spring on the said trigger support adapted to urge the said trigger bearing to rotate thereon whereby to release the said trigger latch rod from the said gravity sliding door when the said trap is sprung by an animal being trapped walking on and lowering either of the hinged floor sections, the said trigger rod being free to pass around either side of an animal in the trap upon the springing thereof.

3. In an animal trap of the type including a gravity sliding door comprising a pair of laterally adjacent hinged floor sections, and a spring loaded trigger mechanism adapted to hold the said gravity sliding door open when the trap is set and releasable responsive to an animal walking onto either of the said hinged floor sections, the said trigger mechanism composed of a trigger support on top of the trap, the said hinged floor sections having their adjacent rearward corners chamfered, a trigger bearing having a convex bearing surface journaled on the said trigger support, a trigger rod fixed to and depending from the said trigger bearing through the trap and including an abutment adapted to engage the raised adjacent chamfered corners of the said hinged floor sections when the trap is set, a trigger latch arm fixed to and extending upwardly from the said trigger bearing, a trigger latch rod connected at one end to the said trigger latch arm and adapted to support the said gravity sliding door at its other end when the trap is set, and a spring on the said trigger support adapted to urge the said trigger bearing to rotate thereon whereby to release the said trigger latch rod from the said gravity sliding door when the said trap is sprung by an animal walking on and lowering either of the hinged floor sections, the said trigger rod being biased out of engagement with the other hinged floor section when one hinged floor section is lowered by the weight of an animal thereon and swingable to pass around either side of an animal in the trap upon the springing thereof.

4. In an animal trap, a frame forming a box-like structure including a floor and a roof, sides and one end of reticulated material and a gravity closing sliding door at the other end having a trigger rod aperture therethrough, a portion of the floor located approximately two-thirds to three-quarters of the length of the trap from the door end of the trap being hinged to admit of a slight upward lifting of the rear end thereof, and a trigger mechanism adapated to hold the said gravity closing sliding door open when engaging the rearward face of the said hinged floor section and releasable responsive to the weight of an animal on the said hinged floor section, the said trigger mechanism comprising a transversely disposed trigger support fixed at each end on the upper longitudinal frame members of the said frame, an annular trigger bearing journaled on the said trigger support and having its inner bore tapered from both ends whereby to permit the said trigger bearing to rock longitudinally of the axis of the said trigger support, a pair of shoulders on the said trigger support adjacent the said bearing and located to limit the rocking movement thereof, a resilient relatively stiff trigger rod including an abutment at the lower end thereof adapted to engage the rear face of the hinged floor section when raised slightly above the normal floor level secured in depending relationship from the said trigger bearing, a trigger latch arm secured in upward extending relationship from the said trigger bearing and having a loop formed in the upper end thereof, a trigger latch rod hooked at one end in the said trigger latch arm loop and having its other end extending through the said trigger rod aperture in the said gravity closing sliding door and adapted to support the said sliding door on the front upper transverse frame member, and a spring on the said trigger support adapted to engage the said trigger latch arm and adapted to urge the said trigger rod abutment against the rearward face of the said hinged floor section when the trap is set and rotate the said trigger bearing when the trap is sprung whereby to withdraw the said trigger latch rod from the aperture in the said sliding door and permit the said door to drop instantly upon the springing of the trap, the said trigger rod being swingable during the springing of the trap to either side of an animal therein.

5. In an animal trap, a frame forming a box-like structure including a floor and a roof, sides and one end of reticulated material and a gravity closing sliding door at the other end having a trigger rod aperture therethrough, a portion of the floor located approximately two-thirds to three-quarters of the length of the trap from the door end of the trap being hinged into two adjacent sections in a manner to admit of a slight upward lifting of the rear ends thereof, the rear adjacent corners of the said hinged floor sections being chamfered, and a trigger mechanism adapted to hold the said gravity closing sliding door open when engaging the adjacent rear chamfered corners of the said hinged floor sections and releasable responsive to the weight of an animal on either of the said hinged floor sections, the said trigger mechanism comprising a transversely disposed trigger support fixed at each end on the upper longitudinal frame members of the said frame, an annular trigger bearing journaled on the said trigger support and having its inner bore tapered from both ends whereby to permit the said trigger bearing to rock longitudinally of the axis of the said trigger support, a pair of shoulders on the said trigger support adjacent the said bearing and located to limit the rocking movement thereof, a resilient relatively stiff trigger rod including an abutment at the lower end thereof of formed generally complementary to and engaging the rear chamfered corners of the hinged floor sections when raised slightly above the normal floor level and secured in depending relationship from the said trigger bearing, a trigger latch arm secured in upper extending relationship from the said trigger bearing and having a loop formed in the upper end thereof, a trigger latch rod hooked at one end in the said trigger latch arm loop and having its other end extending through the trigger rod aperture in the said gravity closing sliding door adapted to support the said gravity closing sliding door on the front upper transverse frame member, and a spring on the said trigger support adapted to engage the said trigger latch arm and adapted to urge the said trigger rod abutment against the adjacent rear chamfered corners of the said hinged floor sections when the trap is set and adapted to rotate the said trigger bearing when the trap is sprung whereby to withdraw the said trigger latch rod from the aperture in the said sliding door and permit the said door to drop instantly upon the springing of the trap, the said trigger rod being biased out of engagement with the other hinged floor section when one hinged floor section is lowered by the weight of an animal thereon and swingable during the springing of the trap to either side of an animal therein.

ARTHUR E. KERN.

REFERENCES CITED

The following references are of record in the file of this patent:

UNITED STATES PATENTS

| Number | Name | Date |
|---|---|---|
| 305,664 | Bryan | Sept. 23, 1884 |
| 2,155,544 | Harlow | Apr. 25, 1939 |